United States Patent [19]
Beecroft

[11] 3,984,872
[45] Oct. 5, 1976

[54] LOAD LEVER RE-CENTERING DEVICE
[75] Inventor: Harold J. Beecroft, Minneapolis, Minn.
[73] Assignee: Control Data Corporation, Minneapolis, Minn.
[22] Filed: Aug. 1, 1975
[21] Appl. No.: 601,575

[52] U.S. Cl. .............................. 360/103; 360/105
[51] Int. Cl.² .................... G11B 5/60; G11B 21/20; G11B 17/32; G11B 21/22
[58] Field of Search ..................... 360/103, 104–106

[56] References Cited
UNITED STATES PATENTS

| | | | |
|---|---|---|---|
| 3,702,461 | 11/1972 | Cantwell | 360/103 |
| 3,725,884 | 4/1973 | Garfein | 360/103 |
| 3,812,535 | 5/1974 | Higgins et al. | 360/103 |
| 3,896,495 | 7/1975 | Beecroft | 360/103 |
| 3,914,792 | 10/1975 | Beecroft | 360/103 |

Primary Examiner—Robert S. Tupper
Attorney, Agent, or Firm—Edward L. Schwarz

[57] ABSTRACT

In magnetic disc recording apparatus, an intermediate arm which transmits spring pressure from a load spring to the transducing head pad is pivoted on a shaft journaled either in holes in the intermediate arm or head arm. These holes have substantially flat interior surfaces obliquely facing the shaft and each other. The angles at which these surfaces are set are chosen to cause the arm to slip if necessary with respect to the load spring whenever the head is lifted from the disc surface, to a centered position with respect to these interior surfaces, by supplying sufficient force to overcome the frictional forces existing on the intermediate arm while the head is being lifted from the recording surface. This centering is important because it repositions the intermediate arm accurately with respect to the cantilevered arm which results in the head being accurately positioned with respect to the arm.

11 Claims, 8 Drawing Figures

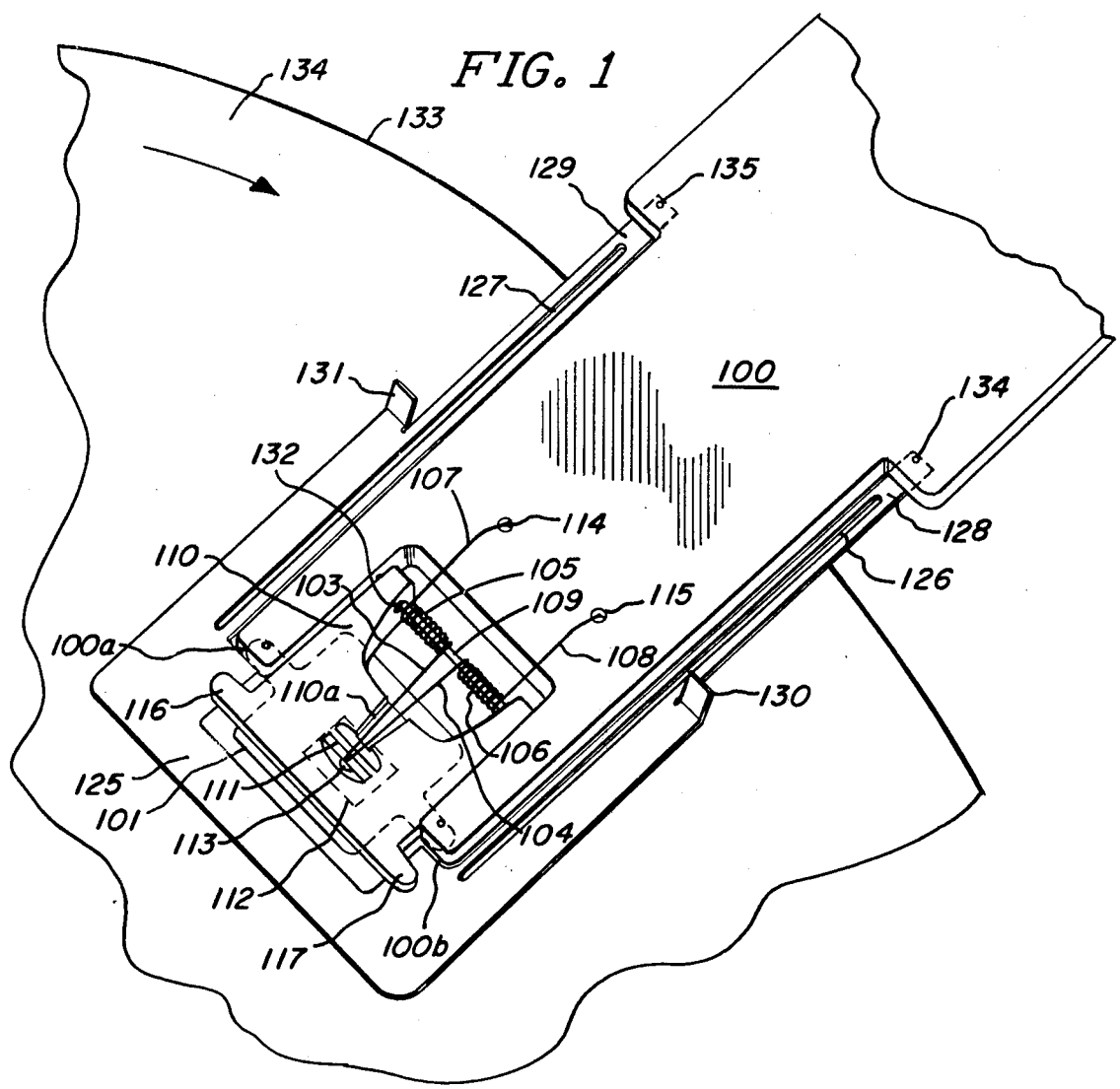
FIG. 1
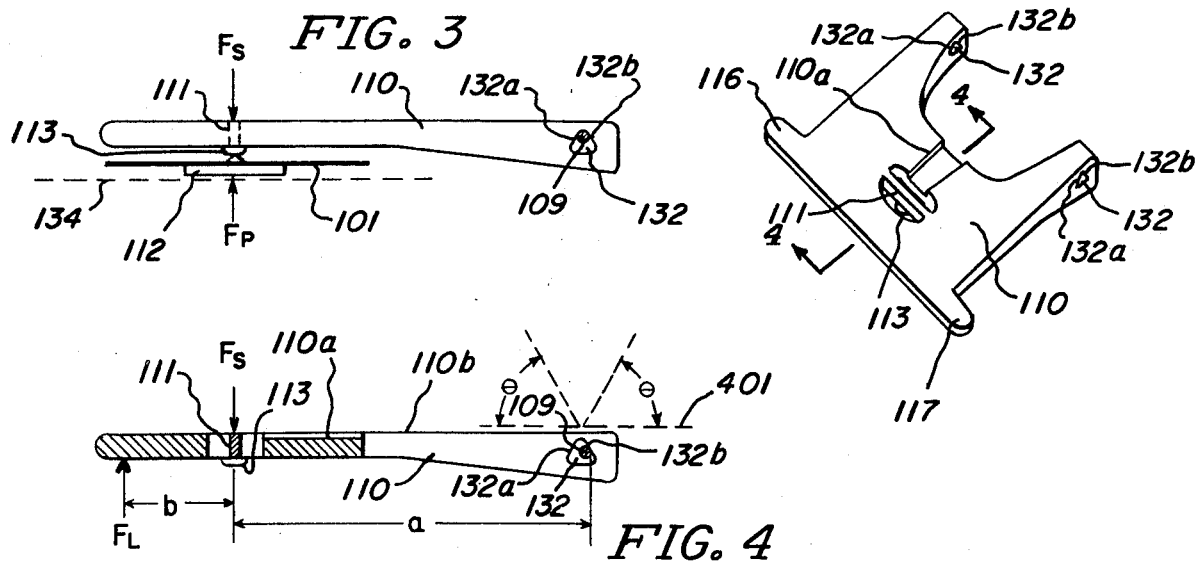
FIG. 3
FIG. 2
FIG. 4

LOAD LEVER RE-CENTERING DEVICE

BACKGROUND OF THE INVENTION

1. Field of the Invention

In the typical magnetic disc recording system, a plurality of recording surfaces are employed, each being accessed by one or more transducing heads associated with that surface only. The transducing heads are all mounted on head arms in turn fixed to a carriage. By shifting the carriage radially* with respect to the discs, the transducing heads may be positioned adjacent any of the recording tracks thereon. A linear motor is used to properly position the carriage to permit data tracks specified by control signals to be accessed by the heads. The means by which the actual radial positions of the various tracks are determined has been accomplished in a variety of ways. An optical grating scribed with lines corresponding to the desired track positions can be employed. Typical such gratings are described in U.S. Pat. Application Ser. No. 454,350, now U.S. Pat. No. 3,872,575, filed Mar. 25, 1974 (Lee et al) and Ser. No. 454,351, now U.S. Pat. No. 3,871,064 filed Mar. 25, 1974 (Schraeder). Specially designed magnetic coils can be used to produce a magnetic signal pattern corresponding to the difference between adjacent disc radii. See U.S. Pat. 3,720,930 (Elsing). In the preferred design employed today, one recording surface contains only servo tracks which are continually read, providing signals specifying the carriage position. See U.S. Pat. Application Ser. No. 458,262, now U.S. Pat. No. 3,903,545, filed Apr. 5, 1974 (Beecroft I). A problem common to all these devices is maintaining the magnetic transducing heads in precise radial relationship with respect to each other and to the carriage after the position of each individual head has been initially adjusted to the desired, nominal position vis-a-vis all the other heads and the carriage.

* The term "radial" or "radially" hereafter refers to the recording disc radius.

In the designs preferred today, each transducing head is embedded in a pad which during operation rides on a thin (5-200 micro-inches) air film between the pad's bearing surface and the disc. The characteristics of the air film are such that the natural tendency of the pad is to ride a greater distance from the disc than is desired. It is therefore necessary to force the pad to the desired distance from the disc. This is accomplished by applying force on a load surface of the pad which faces away from the bearing surface. Because of recording surface movement caused by spindle bearing runout and lack of disc flatness, each individual head must be capable of shifting very rapidly with respect to its supporting arm, perpendicular to its recording surface. Therefore, the force is preferably applied by a spring whose spring constant is relatively constant for the head motion involved, to permit the head to maintain a constant distance from the recording surface. Because capability of the pads to shift very rapidly with respect to their supporting structures in response to these recording surface permits the pads to ride at a desirable small distance from the recording surfaces, it is preferred to make the high mass head arm itself very rigid and allow only the low mass head and its immediate support structure to follow the movements of the recording surface. See U.S. Pat. Application Ser. No. 526,554, now U.S. Pat. No.3,914,792, filed Nov. 25, 1974 (Beecroft II).

When retracting the head arms, it is necessary to lift the pads away from the recording surface before the air film disappears at the rim of the disc. To simplify this procedure, the lifting force is applied to an intermediate arm which is positioned between the spring arm and the pad, and which also transmits the spring force counteracting the air film lift to the pad. This intermediate arm is pivoted on a shaft attached to the head arm. Because the hole in the intermediate arm through which this shaft passes must be slightly larger than the shaft itself to prevent binding, the intermediate arm can during operation shift radially. This shift, or backlash, is very small, on the order of a few ten thousandths of an inch at most. Fast accelerations and decelerations caused by vibration and carriage motion, and accidental rotation of the intermediate arm during installation all can cause this slight shifting of the intermediate arm. Errors so introduced though small are frictionally transmitted to the pad and form a significant percentage of the total tolerance allowable for accurate accessing of individual data tracks.

2. Description of the Prior Art

The Beecroft II application involves a flexible coupling between the spring arm and the head itself which reduces radial stress on the head pad support. Merely decreasing the tolerance between the pivot shaft for the intermediate arm and the holes through which it passes runs the risk of causing binding and sticking of the intermediate arm. Applicant is not aware of any head arm mechanisms which self-correct pivot backlash.

BRIEF DESCRIPTION OF THE INVENTION

The invention comprises an improvement which accurately repositions the intermediate arm each time force is applied to the intermediate arm to lift the pad. This improvement comprises at least one substantially plane wall or surface within the hole or holes on which the shaft is journaled. This surface is angled with respect to a plane substantially perpendicular to the spring and lifting forces. When lifting force is applied to an out-of-position intermediate arm, the angled wall is forced into contact with the shaft. The angle is chosen such that force produced through the camming of wall against shaft is sufficient to overcome friction on the intermediate arm and slip it to its correct position. A stop halts slipping of the intermediate arm when the correct position is reached. In the preferred design, two angled walls are employed facing each other and the shaft such that application of the lifting forces to an out-of-position arm forces one or the other wall into contact with the shaft and causes slipping until the shaft is tangent to both walls, which stops the slippage. The walls can be in either the head arm or the intermediate arm. They may be oriented to face either upwardly or downwardly, depending on the points at which spring and lifting forces are applied. A static analysis of the forces involved allows computation of the minimum angle at which the walls must be placed.

Because these flat surfaces make, in effect, line contact with the shaft, it is important that any contact between the walls of the hole and the shaft during normal operation involve very low force, to prevent wearing of either shaft or interior pivot hole surfaces. For this reason, it is preferred that spring load force be applied to the intermediate arm so as to be approximately colinear with the resultant gas film force on the pad. This causes the shaft to essentially "float" within the pivot hole and contact the pivot hole walls very lightly, if at all. This arrangement of the forces also prevents the spring load force from being directed non-perpendicularly to the bearing surface of the pad.

BRIEF DESCRIPTION OF THE DRAWINGS

FIG. 1 is a perspective view of the upper surface of an assembled head arm having an intermediate arm employing the invention.

FIG. 2 is a perspective view of the intermediate arm designed to employ the invention.

FIG. 3 is a side view of the head pad, its support, the intermediate arm in its preferred position, and the recording surface during transcribing of data.

FIG. 4 is a cross-sectional view of an improperly positioned intermediate arm of FIG. 2 at the start of pad lifting.

DESCRIPTION OF THE PREFERRED EMBODIMENTS

Figure 7:
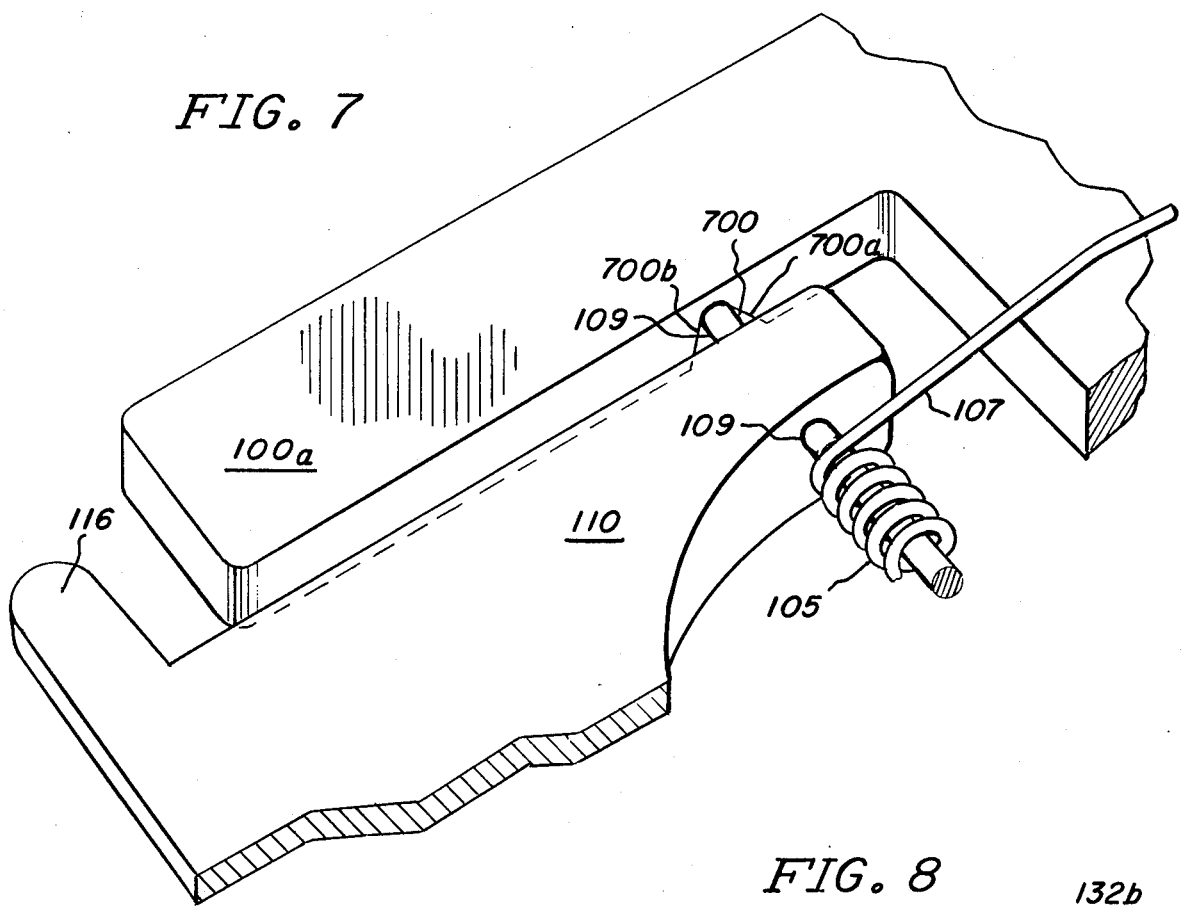
FIG. 7 is a perspective view of an alternative embodiment in which the plane walls which correct the radial position of the intermediate arm are located in the head arm itself.

The operational head arm assembly shown in FIG. 1 comprises a head arm 100 having projections 100a and 100b to which head support 101 is attached. The preferred configuration for support 101 is that of the gimbal spring described for example, in Beecroft II. Head support 101 carries magnetic head pad 112, shown in dotted outline in FIG. 1 and in side view in FIG. 3. During normal operation, head pad 112 is located so as to lace its transducing face adjacent a rotating recording disc 133 (whose recording surface 134 is shown on edge in FIG. 3) thereby permitting data transcription in the usual fashion. Springs 105 and 106 acting through their arms 107, 108, 103 and 104 apply force to web 111 in intermediate arm 110 to counteract the air film lift which the relative movement between head 112 and recording surface 134 creates, to hold the transducing surface of pad 112 at the proper distance from recording surface 134. In FIG. 3, the resultant of the lift created by the air film between the transducing surface of pad 112 and recording surface 134 is denoted as $F_p$. The force of springs 105 and 106 counteracting the air film lift is denoted as $F_s$. When arm 110 is in its preferred position, force $F_p$ is substantially colinear with spring force $F_s$. Ideally, forces $F_p$ and $F_s$ create a small couple tending to lift sides 132a and 132b away from pivot shaft 109. By so positioning the lines of action of these two forces, only the bottom of hole 132 contacts shaft 109, and that only very lightly during transcribing operations. The continual slight rotation which intermediate arm 110 undergoes due to vertical movements of recording surface 134 during rotation will therefore cause little or no abrasion of either shaft 109 or hole 132, and will cause little or no contact at all of flat hole surfaces 132a and 132b during operation, which is necessary since the precise geometry of these walls is an important part of the invention. In addition, no couple is created by these forces sufficient to torsionally distort web 111 causing load button 113 to apply force to head pad 112 non-perpendicularly to recording surface 134, and force pad 112 out of position.

Figure 5:
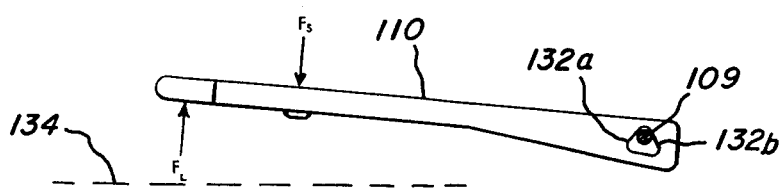
FIG. 5 is a simplified side view of the intermediate arm after the pad has been lifted.

At times during operation of the head arm assembly intermediate arm 110 will shift slightly in one direction or the other radially* thereby causing shaft 109 to occupy a position in hole 132 such as is exaggeratedly shown in FIG. 4, not precisely centered with respect to surfaces 132a and 132b. This shift, although very small is actual operation, imposes radial stress on support 101 through torsional distortion of web 111 and causes the small but significant shift discussed above, in the position of pad 112. Misalignment between the head embedded in pad 112 and the desired recording track in surface 134 then results. Intermediate arm 110 is lifted by lift arm 125 (lift arm 125 being lifted itself by cams, not shown, which engage the faces of followers 130 and 131 facing away from the viewer) during retraction of the head arm assembly. As shown in FIG. 4, the force $F_1$ of lift arm 125 on intermediate arm 110 creates a couple with spring force Fs causing intermediate arm 110 to rotate in a clockwise direction and surface 132b (or 132a depending on the direction which arm 110 has been shifted) to first contact shaft 109. The angle which surfaces 132a and 132b make with their direction of motion during this rotation of arm 110 is chosen such that arm 110 is caused to shift radially, slipping on both lift arm 125 and spring arms 103 and 104. This slipping continues until shaft 109 has reached a position where it is tangent to both surfaces 132a and 132b, as shown in FIG. 5. It is obvious that the acute angle made by walls 132a and 132b with respect to a surface perpendicular to the lines of action of forces Fs and $F_t$ must be great enough to overcome the frictional forces between intermediate arm 110 and lift arm 125, spring arms 103 and 104 and shaft 109. Once shaft 109 is tangent to both or positioned midway between surfaces 132a and 132b, arm 110 has regained the position in which it transmits no radially directed forces to support 101 via web 111. It can be seen that arm 110 should make only low friction contacts while slipping. Thus, its fabrication from a low friction material such as nylon or Delrin may be desirable.

\* "Radially" has been previously defined to refer to the radius of the recording disc. In FIGS. 3–6 radial motion is in the plane of the drawing.

FIG. 2 illustrates the intermediate arm removed from the head arm assembly of FIG. 1. Hole 132 is interrupted by the cutout portion which provides space for springs 105 and 106 to be carried by shaft 109. Each segment of hole 132 is of identical cross section. Interior walls 132a and 132b occupy identical positions in both segments, and in general intersect at an apex opening downwardly (in the displayed orientation). The angles at which surfaces 132a and 132b are set must be chosen to provide sufficient repositioning force as explained above.

The appropriate angles at which surfaces 132a and 132b are set can be determined by classical static analysis. FIG. 4 discloses the critical dimensions in performing the analysis. It is assumed that the lifting force $F_l$ supplied by lift arm 125 is along a line parallel to the line along which force Fs acts, and separated from it by distance b. The contact point between shaft 109 and surface 132b (or 132a) is separated from the line along which force F acts by distance a. The acute angle between surface 132a or surface 132b and reference line 401, which is perpendicular to the line of action of forces Fs and $F_l$, is $\theta$.

Several reasonable assumptions are made in the mathematical analysis for greater ease of understanding. It is assumed that the coefficient of static friction between arm 110 and lift arm 125, spring arms 103 and 104, and shaft 109 is $\mu$. This assumption is quite accurate if lift arm 125, spring arm 103 and 104, and shaft 109 are all made from the same material and intermediate arm 110 is homogeneous. Implicit in the dimensions previously defined for FIG. 4, is the fact that the direction of forces Fs and $F_l$ do not change during retraction of head 112. For the small displacements involved here, this is a reasonably accurate assumption, because the length of spring arms 103 and 104 and lift arm 125 is relatively long compared to the distance which the head is lifted. It is also assumed that distances a and b do not change. This is incorrect for distance a, because arm 110 shifts either to the right or left during re-centering. It is clear that for increasing of length a, angle $\theta$ must correspondingly increase. This problem can be easily resolved by choosing for length a the largest possible value which it can assume during normal operation. Because each of the points on lift arm 125 contacting intermediate arm 110 travel along a circle having greater radius than does the corresponding point on intermediate arm 111, the assumption that force $F_l$ acts along a line parallel to force Fs is not totally accurate. To be precisely correct, since force Fs is very nearly tangent to a circle centered at shaft 109, the additional radius between these contact points on lift arm 125 and its flexing areas 128 and 129, it may be necessary to perform separate analyses for the extreme and final positions of shaft 109. It is quite likely, however, that if calculations for assumed initial conditions dictate that slipping of the type desired will occur at all, it will continue until repositioning is complete because of the fact that the coefficient of kinetic friction for most combinations of engineering materials is significantly less than that of static friction. Since the analysis which follows shows the minimum surface angle to be dependent on $\mu$, this difference in $\mu$ for static and kinetic conditions adequately compensates for deviations from the assumed which tend to oppose the desired slipping after slipping has started.

Figure 6:
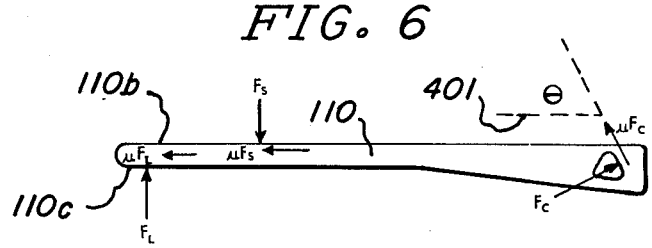
FIG. 6 is a free body diagram of the intermediate arm displaying all of the forces to which it is subjected during lifting of the pad.

The analysis can be best understood by referring first to FIG. 6, which is a simple free body diagram of the forces on arm 110 at the start of lifting of it. The friction force $\mu F_l$ resulting from the lifting force $F_l$ is assumed to be perpendicular to the line of action of force $F_l$ and intercept surface 132b. The friction force $\mu$ Fs caused by spring arm force Fs is assumed to be colinear with friction force $\mu F_l$. This assumption is relatively accurate unless arm 110 is very thick compared to its length. Also, the moment produced by friction force $\mu F_l$ is in great part counterbalanced by the moment produced by friction force $\mu$ Fs. Force Fc, produced by the camming of wall 132b against shaft 109, is considered to be perpendicular to surface 132b. The friction force $\mu$ Fc produced by the camming action is assumed to be parallel to this surface and hence at angle $\theta$ with respect to forces $\mu$ Fs and $\mu F_l$.

To determine the minimum value $\theta$ can have, $\theta m$, in terms of a, b and $\mu$, the technique used is to set the sums of forces in the horizontal direction and in the vertical direction to zero (equations I and II) and to set the sum of moments of these forces about a convenient point, equal to zero (equation III). The point chosen in equation III is the point at which lift arm 125 contacts intermediate arm 110. The sign convention adopted is that forces directed upwardly and to the right are positive, and clockwise moments are positive $\Sigma F_x = 0 = -\mu F_1 - \mu Fs + Fc \sin \theta m - \mu Fc \cos \theta m$ (I)

$\Sigma F_y = 0 = F_1 - Fs + Fc \cos \theta m + \mu Fc \sin \theta m$ (II)

$\Sigma M = 0 = Fs \, b - (a + b) Fc \cos \theta m - \mu Fc (a + b) \sin \theta m$ (III)

Solving these equations simultaneously yields an angle $\theta m$ which is the minimum value which $\theta$ may have to ensure the desired slipping:

$$\theta m = \text{arc cot} \frac{b - \mu^2(b + 2a)}{2\mu(b + a)}$$

Since $\mu$ is usually quite small, the term $\mu^2 (b + 2a)$ can be neglected in many cases. FIG. 5 shows arm 110 at the completion of the head pad lifting operation, in a somewhat exaggerated position.

Several variations on this preferred embodiment are possible. In FIG. 7, shaft 109 is fixed with respect to arm 110, and is journaled to rotate in cavity or hole 700. Cavity 700 is faced by an identical cavity, not shown, in projection 100b. Shaft 109 is fixed to arm 110 by any convenient means, such as a set screw or as is shown in FIG. 7, a simple interference fit. Because arm 100a is frequently built of aluminum for machining ease and light weight, and since the coefficient of friction between aluminum and the steel from which shaft 109 is likely made may be relatively high, it may well be desirable to provide a plastic insert containing cavity 700 to provide a relatively low friction surface on which shaft 109 can slip.

Figure 8:
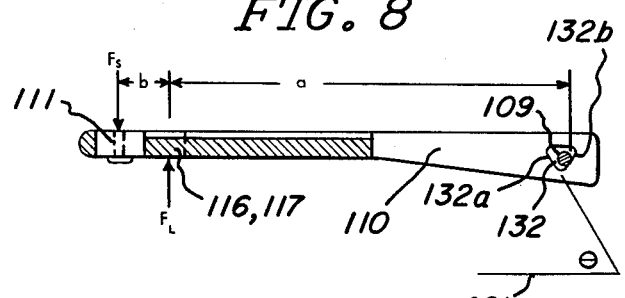
FIG. 8 is a side view of an intermediate arm displaying a variation on the points of spring and lifting force application.

FIG. 8 discloses yet another embodiment of this invention, usable with a design employing an intermediate arm 110 having lifting tabs 116 and 117 between strip 111 and hole 132 when viewed on edge, as in FIG. 8. This is denoted in FIG. 8 by the arrow for force $F_l$ occupying a selected position between the point at which force Fs is applied to arm 110 and hole 132. The appropriate angles at which surfaces 132a and 132b are placed are of course again selected so as to cause the desired slipping with the shaft 109 finally becoming centered when tangent to both surfaces 132a and 132b. With dimensions a and b as measured, the formula derived above for $\theta m$ is equally applicable to the apparatus shown in FIG. 8, again being measured as the acute angle made by either surface 132a or 132b with surface or line 401 perpendicular to the lines of action of forces Fs and $F_l$, as displayed in FIG. 4.

Forces Fs and $F_l$ can be applied to intermediate arm 111 in a variety of ways. It is believed that those skilled in the art will have no problem determining mathematically the appropriate geometry for such variations. If, e.g. forces Fs and $F_l$ are not applied along parallel lines, the angle which each surface 132a and 132b makes with the chosen datum line can be calculated by application of the previously discussed principles. Or, it may be that the angle between surface 132a and surface 401 must be different from that for surface 132b. This can be determined by performing two analyses, one for shaft 109 contacting each surface. Those skilled in the art should have no trouble implementing these variants.

Having thus described this invention, what I desire to claim and secure by letters patent is:

1. Head pad loading apparatus for use in data recording apparatus of the type which employs a moving recording medium; a head pad having a bearing surface supportable adjacent the recording medium by the gas bearing created by relative motion therebetween, a load surface facing away from the bearing surface, and a head carried by the pad in transducing relationship to the medium when so supported; and a cantilevered head arm extending above the recording disc and having support means supporting the head pad with its bearing surface adjacent the recording medium in a manner permitting motion relative the arm perpendicular to the recording medium surface, and resisting motion relative the arm parallel to the recording medium surface, wherein the head pad loading apparatus comprises:
  a. a shaft supported by the head arm at a first spaced apart pair of support points on the shaft;
  b. a load arm having a first side and an oppositely facing second side having a contact point, said load arm rotatably supported by the shaft at a second pair of spaced-apart support points on the shaft to allow the first side to contact the head pad load surface, and having a preferred position respective the head arm;
  c. a spring loaded spring arm rotatably attached to the head arm and slidably pressing on the contact point to urge the first side of the load arm toward the head pad load surface;
  d. lifting means slidably engaging the first side of the load arm for applying force thereat in a direction generally opposite that applied to the contact point by the spring arm, and creating a couple with the spring arm's force; and
  e. a pair of substantially identical inner bearing surfaces, in at least one of the load arm and head arm each bearing surface journaling the shaft, at a preselected pair of support points, with preselected clearance, each bearing surface including at least one wall obliquely positioned with respect to the lines of action of the spring arm and lifting means forces on the load arm and which is forced into contact with the shaft during operation of the lifting means when the load arm is not in its preferred position thereby generating force having a component transverse to said lines of action and of direction and magnitude sufficient to cause sliding of the load arm with respect to the lifting means and the spring arm toward it preferred position.

2. The apparatus of claim 1, wherein each bearing surface includes a pair of walls one each lying in one of a pair of intersecting planes.

3. The apparatus of claim 2 wherein the bearing surfaces form a part of the load arm and the shaft is fixed with respect to the head arm.

4. The apparatus of claim 2, wherein the resultant of the lift force generated by the gas bearing is approximately colinear with the spring arm force.

5. The apparatus of claim 2 wherein the distance between the shaft and the point at which the lifting means contacts the load arm exceeds that between the shaft and the contact point.

6. The apparatus of claim 2 wherein the distance between the shaft and the contact point exceeds that between the shaft and the point at which the lifting means contacts the load arm.

7. The apparatus of claim 2, wherein the bearing surfaces form a part of the load arm, the shaft is fixed in the head arm, the gas bearing lift force resultant is substantially colinear with the spring arm-generated force, and the distance between the shaft and the point at which the lifting means contact the load arm exceeds that between the shaft and the contact point.

8. The apparatus of claim 2, wherein the bearing surfaces form a part of the head arm and the shaft is fixed in the load arm.

9. The apparatus of claim 8, wherein the bearing surfaces are integral with a low friction inert fixed to the head arm.

10. The apparatus of claim 2, wherein the distance between the lines of action of the spring arm and load arm forces is $b$, the distance between the shaft and the closer thereto of said lines of action is a, the load arm has static coefficient of friction $\mu$, with the lifting means, spring arm and shaft, and the acute angle formed by each intersecting plane with a plane perpendicular to said lines of motion is no less than arc cot $b/2 \mu(b + a)$.

11. The apparatus of claim 10 wherein said acute angle is no less than $$\text{arc cot } \frac{b - \mu^2(b+2a)}{2\mu(b+a)}.$$

* * * * *